J. T. OWEN.
Car Wheel.

No. 98,099.

Patented Dec. 21, 1869.

Witnesses
Wm Burns
David Brooks

Inventor
Joshua T Owen

UNITED STATES PATENT OFFICE.

JOSHUA T. OWEN, OF PHILADELPHIA, PENNSYLVANIA.

IMPROVEMENT IN RAILWAY-CAR WHEELS.

Specification forming part of Letters Patent No. 98,099, dated December 21, 1869.

*To all whom it may concern:*

Be it known that I, JOSHUA T. OWEN, of Philadelphia, Pennsylvania, have invented a new and useful Improvement in Car-Wheels, of which the following is a specification:

The invention herein described is an improvement on the wheel for which Letters Patent were allowed to me on the 29th October, 1869.

My object is the construction of a wheel having an elastic central bearing, and in which the springs employed to secure the requisite elasticity shall be covered and adequately protected against the ingress of dust, dirt, and other foreign matters.

The flange, tread, and web of the wheel are cast in one piece, which is detachable from the axle, and is provided with a central aperture, with recesses, to form sockets for the springs which are designed to act directly or (a plate or other follower being interposed) intermediately on the axle, said springs being secured in their sockets, and covered by an enlarged shoulder inside and by a removable close cap on the outside of the wheel.

Figure 1:
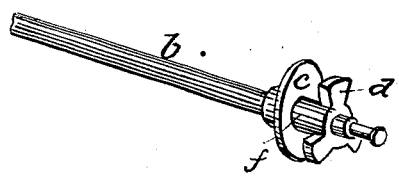
Figure 2:
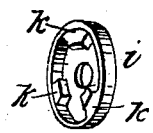
Figure 3:
Figure 4:
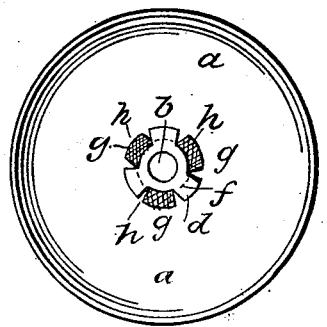
Figure 5:
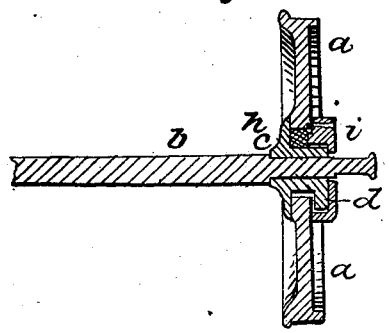

In the drawings, Figure 1 is a perspective view of the axle and the sleeve and shoulder thereon for embracing the wheel; Fig. 2, a similar view of the removable close cap; Fig. 3, a similar view of one of the gum springs; Fig. 4, an elevation of the wheel, showing the axle, sleeve, and springs in place and the cap removed; Fig. 5, diametrical section.

Referring to Fig. 5, $a$ represents the casting, which comprises the flange, tread, and web of the wheel; $b$, the axle. $c$ and $d$ are collars on a sleeve, $f$, the three being cast in one piece, which is detachable from the journal to which it is keyed or otherwise securely fastened.

The recesses $g$ for the springs are shown in Figs. 4 and 5 filled with the india-rubber springs $h$. $i$ is the removable cap, which covers the springs on the outside of the wheel.

The cap $i$ is provided with the interior lugs $k$, Fig. 2, corresponding with the notches in the shoulder $d$. When cap $i$ is in place the lugs $k$ enter said notches. This cap is represented to be secured to the wheel by screws; but pins, bolts, or other secure fastenings may be used. It is also held in place by the journal-box commonly employed on cars.

The central aperture in cap $i$ is made larger than the axle, in order to allow for the action of the springs. The shoulder $c$ covers the springs and protects them against dust, &c., coming from the inside, while the cap $i$ performs a similar office on the outside of the wheel.

In place of the india-rubber springs, metallic spiral springs, or spiral springs made into polygonal form to fit the shape of the recesses $g$, may be employed. In putting the parts of the wheel together, the sleeve $f$ is first fastened on the axle, which is then passed through the central aperture of the wheel, the recesses $g$ allowing the projecting parts of shoulder $d$ to pass through. The axle is then turned until said projections are brought into the position shown in Fig. 4. The springs are then pressed into the recesses $g$, and finally the cap is applied.

I claim as my invention—

A car-wheel which consists of the casting $a$, provided with a central recessed aperture, in combination with the springs $h$, sleeve and shoulders $f\ c\ d$, and cap $i$, substantially as set forth.

JOSHUA T. OWEN.

Witnesses:
WM. BURNS,
DAVID BROOKS.